United States Patent [19]

Camerik

[11] 4,252,412
[45] Feb. 24, 1981

[54] OPTICAL FOCUSSING DEVICE

[75] Inventor: Eduard Camerik, Eindhoven, Netherlands

[73] Assignee: U.S. Philips Corporation, New York, N.Y.

[21] Appl. No.: 84,269

[22] Filed: Oct. 12, 1979

[30] Foreign Application Priority Data

Jun. 13, 1979 [NL] Netherlands .................. 7904618

[51] Int. Cl.³ .................................. G02B 7/04
[52] U.S. Cl. .................... 350/255; 369/112; 358/128.5
[58] Field of Search ............ 179/100.3 V; 350/252, 350/255; 358/128.5

[56] References Cited
U.S. PATENT DOCUMENTS 3,594,068  7/1971  Kirstein et al. ............... 350/255
4,021,101  5/1977  Camerik ....................... 350/255
4,110,008  8/1978  Uesugi et al. ................. 350/255

Primary Examiner—F. L. Evans
Attorney, Agent, or Firm—Thomas A. Briody; William J. Streeter; Algy Tamoshunas

[57] ABSTRACT

An optical focussing device for focussing a radiation beam emanating from a radiation source onto a record carrier (1), and more specifically for focussing a light beam onto a video disc or audio disc, comprises a frame (3) in which an objective (10) is movable axially in the direction of its optical axis (15) with the aid of a drive system (4-7, 16). In order to avoid damaging of the record carrier (1) at last one elastic bumper (37) is secured to the free end (11) of the objective (10), which bumper absorbs shocks and prevents marring of the record carrier in the event of contact between the objective and the record carrier.

4 Claims, 3 Drawing Figures

OPTICAL FOCUSSING DEVICE

BACKGROUND OF THE INVENTION

The invention relates to an optical focussing device, for focussing a radiation beam emanating from a radiation source onto a record carrier, in particular for focussing a light beam emanating from a light source onto the reflecting surface of an information disc, comprising a frame; an objective having a free end to be directed to the record carrier and having an optical lens system accommodated in a lens mount; a drive system for axially moving the objective relative to the frame in the direction of its optical axis; as well as axial guide means for axially guiding the objective relative to the frame.

Such an optical focussing device is for example known from the Applicant's U.S. Pat. No. 4,021,101. The optical focussing device described in said Patent is intended to focus a light beam from a helium-neon laser onto an optically readable video disc. The objective is movable in the direction of its optical axis over a distance which is limited by stops. This distance is sufficiently large to ensure that in any situation occurring during use the objective is capable of focussing the light beam on the information surface of the video disc in the required manner. In such optical focussing devices contact between the objective and the information disc may be inevitable under certain circumstances. In the previously mentioned video disc players the objective for example is disposed at a distance of only approximately 2 mm from the video disc surface during operation. Under unfavourable circumstances, for example in the event of a fault in the focussing control circuit during operation or when it is attempted to play a video disc which has been deformed to such an extent that the disc no longer meets the specifications imposed on video discs in respect of disc flatness, the objective may touch the disc surface. Such contact between the objective and the video disc may give rise to damaging of the objective as well as of the disc surface. In the latter case this may result in video information which can no longer be read satisfactorily at the damaged location.

SUMMARY OF THE INVENTION

It is the object of the invention to provide an optical focussing device of the type mentioned in the preamble in which damage as a result of contact between the objective and the surface of the information disc may be prevented and the invention is characterized in that the free end of the objective is provided with at least one elastic bumper for absorbing shocks between the movable objective and the record carrier in the event of contact between the objective and the record carrier. Owing to the use of the elastic bumper any contact between the objective and the record carrier is no longer attended by damage to the objective and/or the record carrier. Thus, an important cause of quality deterioration of the reproduction of a recording contained on a record carrier is eliminated.

An embodiment of the invention is characterized in that the bumper comprises an elastic bumper ring which is coaxial with the lens system. In this respect it is advantageous to use an embodiment of the invention which is characterized in that the bumper ring is constituted by an elastic O-ring.

BRIEF DESCRIPTION OF THE DRAWING

The invention is described in more detail with reference to the drawing, which shows two embodiments of the invention wherein.

DESCRIPTION OF THE PREFERRED EMBODIMENTS

Figure 1:
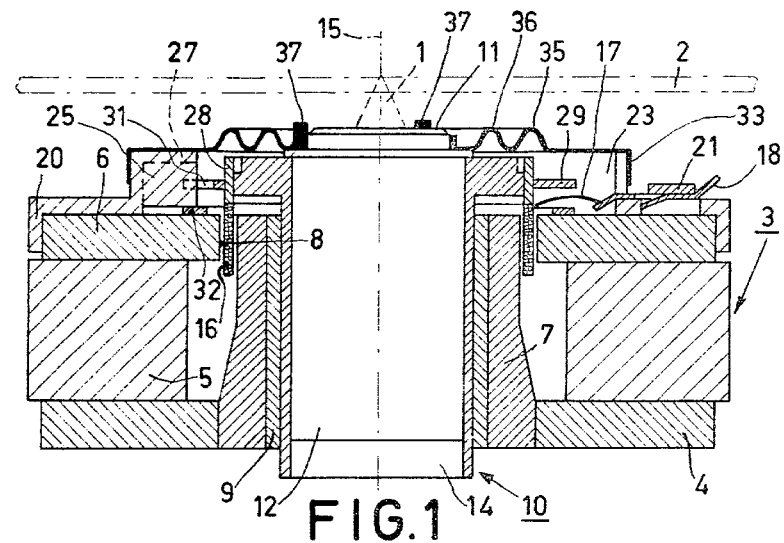
FIG. 1 is a cross-sectional view of a focussing device intended for reading a video disc.
Figure 2:
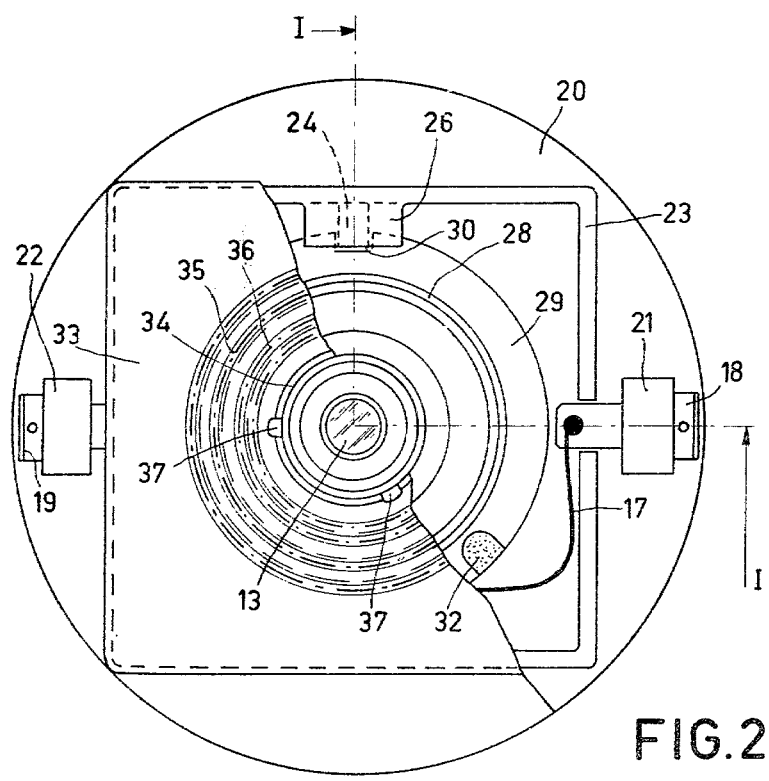
FIG. 2 is a plan view of the focussing device of FIG. 1, a protective seal being cut away partly.

The optical focussing device of FIGS. 1 and 2 is adapted to focus a light beam 1, coming from a light source not shown, on a video disc 2. The focussing device comprises a frame 3, which essentially comprises a first soft-iron plate 4, an annular axially magnetized permanent magnet 5, a second soft-iron plate 6, as well as a soft-iron substantially tubular metal magnet core 7. Between the magnet core 7 and the soft-iron plate 6 an annular air gap 8 is formed. In the soft-iron magnet core 7 a bearing bush 9 is arranged, whose inner surface has self-lubricating properties owing to the presence of polytetrafluroethylene. In said bearing bush a objective 10 is movable having a free end 11 which faces the video disc 2 and having a lens mount 12 in which an optical lens system is accommodated. In this lens optical system lens 13 which is nearest video disc 2 is shown in FIG. 2. Lens mount 12 is mounted in movable aluminium bearing bush 14, which on its outer surface which faces bearing bush 9 and is provided with a hard and smooth surface layer, obtained by opalization treatment.

The objective 10 is driven by an electromagnetic drive system which mover objective relative to frame 3 in the direction of its optical axis 15. The drive system comprises an annular coil 16, which is movable in the annular air gap 8 between the soft-iron plate 6 and the soft-iron magnet core 7. Coil 16 is connected to a metal connecting strip 18 by means of a coil lead 17 (see FIG. 2) and to a second connecting strip 19 by means of a similar second coil lead, not shown. By means of these two connecting strips, the optical focussing device is electrically connectable to an electronic control device, that supplies direct voltages of the required magnitude and polarity to the coil so as to provide focussing movement to objective 10. The electromagnetic drive system thus functions similarly to a loudspeaker magnet coil system. Axial guidance of the objective is then realized by means of the bearing bushes 9 and 14.

A plastic frame 20 is secured to upper soft-iron plate 6. The two metal connecting strips 18 and 19 are passed underneath bridges 21 and 22 of frame 20. The frame is provided with a substantially square raised edge 23, which at two locations on the inner side is provided with guide cams 24 and 25 as well as stops 26 and 27. Coil 16 is coaxially glued onto a sleeve 28, which carries an annular flange 29. Flange 29 is formed with two recesses 30 and 31 that correspond to stops 26 and 27. Thus, the cams 24 and 25 prevent rotation of the objective 10 about its optical axis 15. Stops 26 and 27 furthermore limit the axial travel of the objective in an upward direction. In the downward direction, the axial travel is limited by cooperation of the flange 29 with a plastic stop ring 32 on the soft-iron ring 6. For protective purposes a rubber seal 33 is fitted over the raised edge 23 of frame 20, which seal in the centre adjoins the objective with a rim 34. In order to ensure that the influence on the axial movements of the objective is minimal seal 33 is provided with two concentric annular folds 35 and 36.

Annular rim 34 which is secured to the free end 11 of objective 10 is provided with integral elastic bumpers 37 for absorbing shocks between objective 10 and video disc 2 in the event of contact between the objective and the video disc. In the embodiment shown in FIGS. 1 and 2, three bumpers 37 are uniformly spaced around the optical axis of the objective 10. The bumpers are small in order to minimize the movable mass. These three bumpers are integral with the rubber seal 33. It is also possible to use a smaller or greater number of separate bumpers, or one continuous annular bumper. The bumpers 37 project approximately 0.3 mm from the end 11 of the objective 10.

Figure 3:
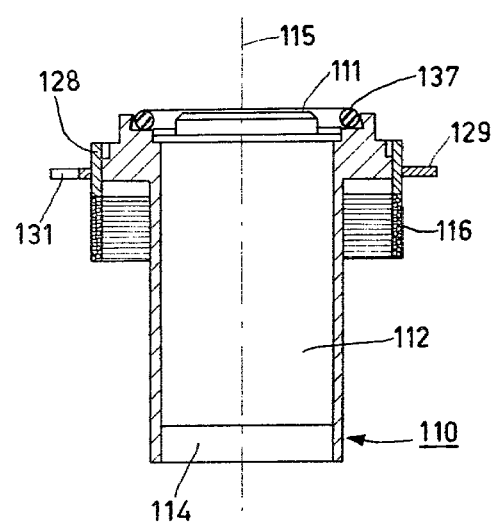
FIG. 3 shows an objective for a focussing device of the type shown in FIG. 1, but with a different construction of the elastic bumper.

FIG. 3 shows an objective 110, which is identical to the objective 10 of FIGS. 1 and 2 in practically all respects. The parts of objective 110 corresponding to those in FIGS. 1 and 2 bear reference numerals which are increased by 100. This objective is not intended for use with a rubber seal corresponding to the seal 33 in FIGS. 1 and 2. In this embodiment the bumper comprises an elastic bumper ring 137 which is coaxial with the optical axis 115. The bumper ring consists of an O-ring of standard dimensions, which is clamped in the upper end of the bearing bush 114. Such O-rings are commercially available in many sizes and are frequently employed to obtain gas or liquid seals. Therefore, they have been worked with precision and are manufactured with small tolerances. The O-ring 137 which is used may for example consist of neoprene rubber.

What is claimed is:

1. An optical focussing device for focussing a light beam emanating from a light source onto the reflecting surface of a record carrier comprising:
   a frame,
   a movable objective having a free end directed at the record carrier and having an optical lens system mounted in a lens mount,
   a drive system for axially moving said objective relative to said frame in the direction of its optical axis,
   axial guide means for axially guiding the objective relative to said frame, and
   resilient means secured to said free end of said objective for preventing marring of said record carrier in the event of contact between said objective and said record carrier.

2. An optical focussing device as claimed in claim 1 wherein said resilient means comprises at least one elastic bumper secured to said free end of said objective.

3. An optical focussing device as claimed in claim 1, wherein said resilient means comprises a plurality of elastic bumpers which are coaxially positioned with respect to said optical axis.

4. An optical focussing device as claimed in claim 1, wherein said resilient means comprises an elastic O-ring.

* * * * *